(12) United States Patent
Valero et al.

(10) Patent No.: US 8,848,484 B2
(45) Date of Patent: Sep. 30, 2014

(54) FILTERING ACOUSTIC WAVEFORMS IN DOWNHOLE ENVIRONMENTS

(75) Inventors: Henri-Pierre Valero, Yokohama (JP); Shinichi Sunaga, Machida (JP); Takeshi Endo, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 169 days.

(21) Appl. No.: 13/310,780

(22) Filed: Dec. 4, 2011

(65) Prior Publication Data

US 2012/0147702 A1 Jun. 14, 2012

Related U.S. Application Data

(60) Provisional application No. 61/420,778, filed on Dec. 8, 2010.

(51) Int. Cl.
*G01V 1/48* (2006.01)
*G01V 1/44* (2006.01)

(52) U.S. Cl.
CPC .............. *G01V 1/48* (2013.01); *G01V 2210/23* (2013.01); *G01V 1/44* (2013.01)
USPC ................... 367/31; 367/29; 367/26

(58) Field of Classification Search
USPC .......................................................... 367/31
See application file for complete search history.

(56) References Cited

U.S. PATENT DOCUMENTS

| | | | | |
|---|---|---|---|---|
| 4,210,967 A | * | 7/1980 | Ingram | 367/34 |
| 5,278,805 A | * | 1/1994 | Kimball | 367/32 |
| 5,550,788 A | * | 8/1996 | Pavone et al. | 367/25 |
| 6,308,137 B1 | | 10/2001 | Underhill et al. | |
| 6,868,341 B2 | | 3/2005 | Valero | |
| 7,089,119 B2 | * | 8/2006 | Mandal | 702/11 |
| 7,120,541 B2 | * | 10/2006 | Wang | 702/11 |
| 7,668,043 B2 | * | 2/2010 | Wu | 367/31 |
| 7,698,066 B2 | * | 4/2010 | Huang et al. | 702/14 |
| 7,764,572 B2 | * | 7/2010 | Wu et al. | 367/31 |
| 2002/0183931 A1 | * | 12/2002 | Anno | 702/14 |
| 2004/0122595 A1 | * | 6/2004 | Valero | 702/11 |
| 2009/0067286 A1 | | 3/2009 | Bose et al. | |

FOREIGN PATENT DOCUMENTS

WO 2011/051782 5/2011

OTHER PUBLICATIONS

Cooper, Computer and Geoscience 35(2009) pp. 1988-1991.*
GB Search Report from the equivalent GB patent application No. 1120980.6 issued on Mar. 9, 2012.

(Continued)

*Primary Examiner* — Luke Ratcliffe
*Assistant Examiner* — Hovhannes Baghdasaryan
(74) *Attorney, Agent, or Firm* — Daryl R. Wright; Jody DeStefanis

(57) ABSTRACT

Methods and apparatus to filter acoustic waveforms in downhole environments are described. An example method involves receiving acoustic waveform data representing acoustic signals traversing at least a portion of a borehole adjacent a subterranean formation and performing a direct transform operation on the acoustic waveform data to generate wavelet map data. The wavelet map data comprises a time-frequency representation of the acoustic waveform data. The example method also involves identifying a waveform of interest via the wavelet map data, extracting data associated with the waveform of interest from the wavelet map data, generating filtered wavelet map data based on the extracted data, and performing an inverse transform operation on the filtered wavelet map data to generate filtered acoustic waveform data

14 Claims, 9 Drawing Sheets

(56) References Cited

OTHER PUBLICATIONS

Grossmann, A., Kronland-Martinet, R., Morlet, J., 1989, "Reading and understanding continuous wavelet transform, Wavelet, Time-frequency Methods and Phase Space," Ed. JM Combes, A. Grossmann, P. Tchamitchian, Springer-verlag, Berlin.

Saracco, G., 1989, "Acoustic propagation in harmonic and transient regime through an inhomogeneous medium: Asymptotic methods and Wavelet transforms", PhD thesis: Acoustics & Dynamic of vibrations, CNRS-UPR 7051-LMA & UER II, Campus de Luminy, Marseille, France.

Morlet, J., Arens, G., Fourgeau, I., Giard, D., 1983, Wave propagation and sampling theory—Part I, Geophysics, 47, 203-221.

Morlet, J., Arens, G., Fourgeau, I., Giard, D., 1983, Wave propagation and sampling theory—Part II, Geophysics, 47, 222-236.

Kimball, C.V and Marzetta, T.L, 1986, Semblance processing of borehole acoustic array data, Geophysics, 49, 274-281.

Lu, C.C., and Liu, Q.H., 1995, A three-dimensional dyadic Green's function for elasticwaves in multilayer cylindrical structures, J. acoust. Soc. Am., 98, 2825-2835.

Lang, S.W., Kurkjian, A.L., McClellan, J.H., Morris, C.F., and Parks, T.W., 1987, Estimating slowness dispersion from arrays of sonic logging waveforms, Geophysics, 52, 530-544.

Armstrong, P., L. Nutt, and R. Minton, 2000, Drilling optimization using drill-bit seismic in the deepwater Gulf of Mexico: Presented at the International Association of Drilling Contractors/Society of Petroleum Engineers Drilling Conference, IADC/SPE 59222.

Valero, H.P., M.Tejada, S. Y, H. Yamamoto, 2005, High Resolution Compressional Slowness Log Estimation Using First Motion Detection, 75th annual SEG meeting, Houston.

P. Rasolofosaon, B. Zinszner, 2003, Petroacoustic Characterization of Reservoir Rocks for Seismic Monitoring Studies. Laboratory Measurement of Hertz and Glassman Parameters, Oil and Gas Science and Technology, 58(6), 615-635, 2003.

H. P. Valero, O. Skelton and C. M. Almeida, "Processing of monopole sonic waveforms through cased hole", 73rd Ann. Internat. Mtg.: Soc. of Expl. Geophys., 285-288, 2003.

\* cited by examiner

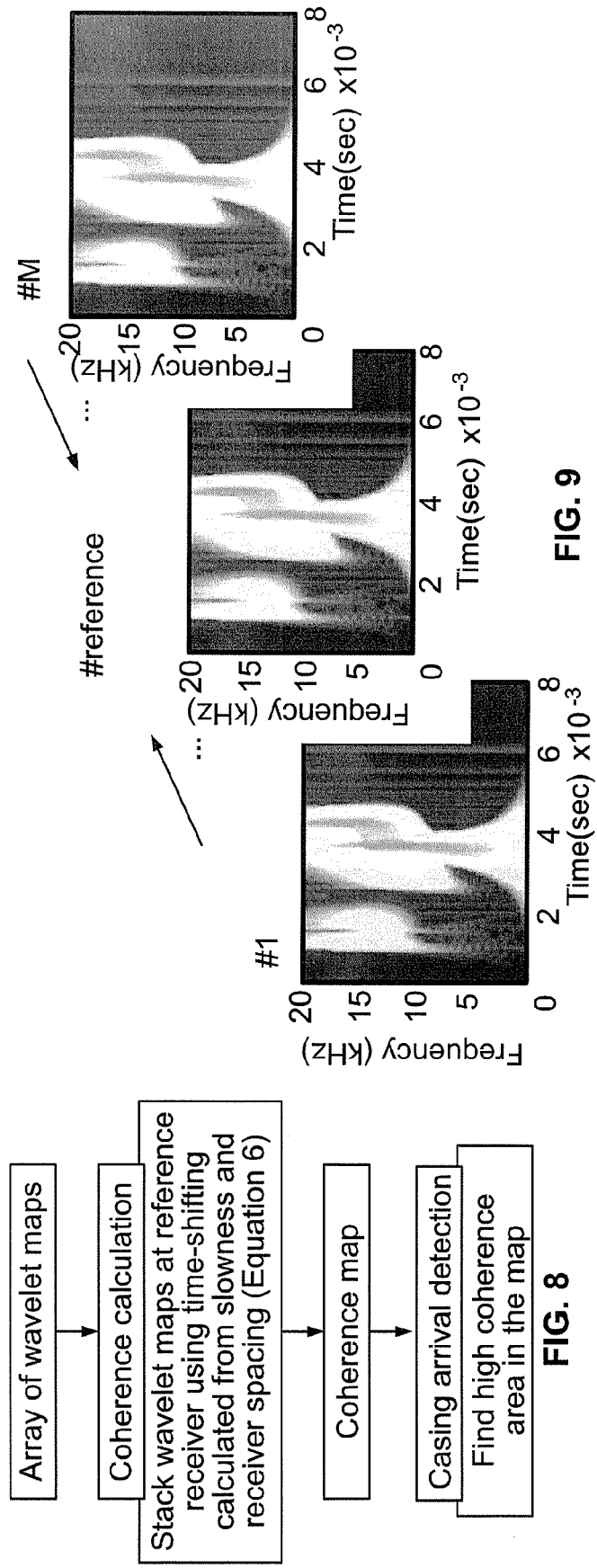
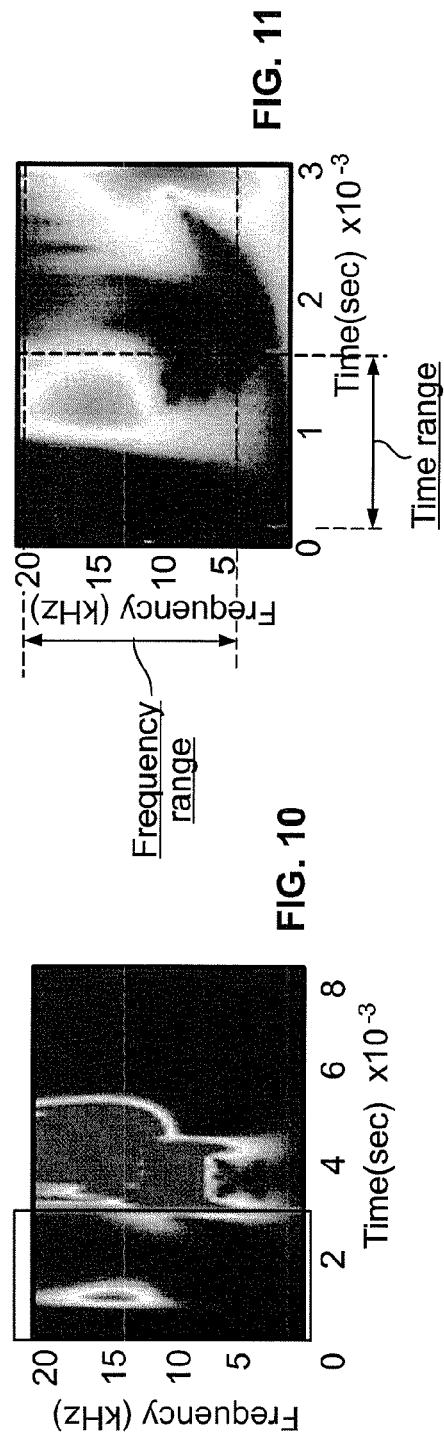
FIG. 9
FIG. 10
FIG. 11
FIG. 8

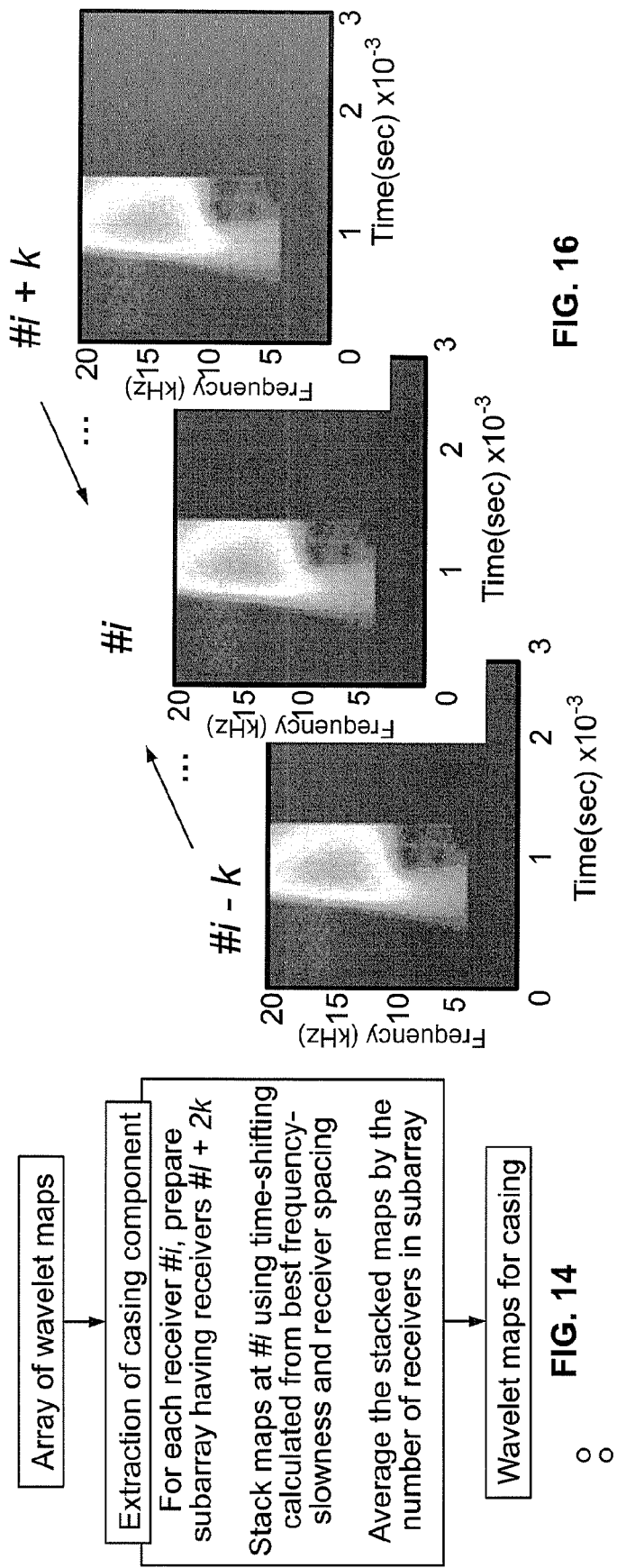

FIG. 16

Extraction of casing component

Array of wavelet maps → For each receiver #i, prepare subarray having receivers #i + 2k → Stack maps at #i using time-shifting calculated from best frequency-slowness and receiver spacing → Average the stacked maps by the number of receivers in subarray → Wavelet maps for casing

FIG. 14

○○○○○○○○○○○○○
i + k ... #i ... #i - k  } Subarray receivers

Full-array receivers ○○

● Prepare for every receiver

FIG. 15

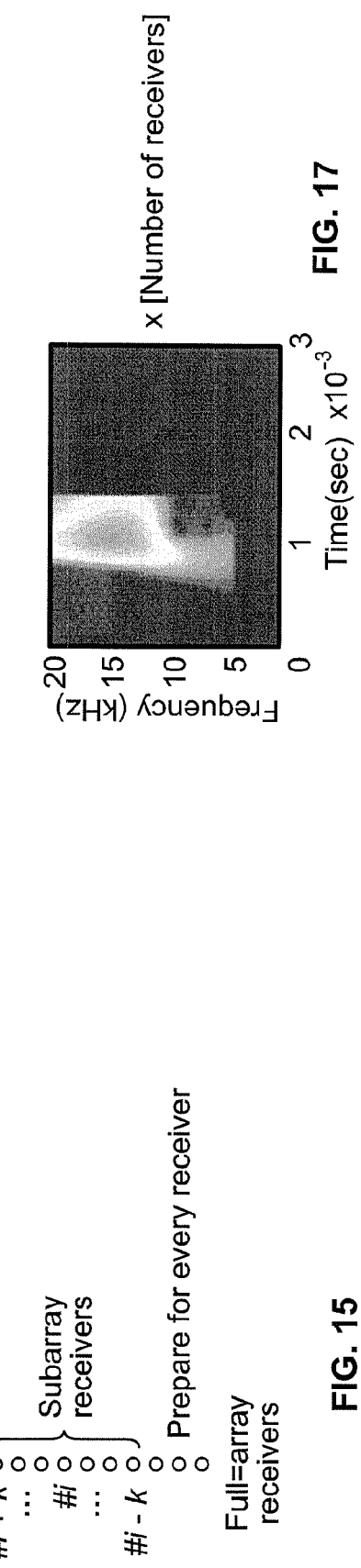

FIG. 17

FILTERING ACOUSTIC WAVEFORMS IN DOWNHOLE ENVIRONMENTS

RELATED APPLICATION

This patent claims the benefit of the filing date of U.S. Provisional Patent Application No. 61/420,778, filed on Dec. 8, 2010, the entire disclosure of which is incorporated by reference herein.

BACKGROUND OF THE DISCLOSURE

In evaluating a subterranean formation, a downhole tool such as a formation tester may be lowered into a wellbore or borehole penetrating the formation and the tool may be used to measure one or more characteristics or parameters of the formation. Acoustic testing is one particularly useful manner of measuring formation parameters such as formation slownesses, which may be used to identify a formation of interest and evaluate the best manner in which to produce hydrocarbon fluids from the formation of interest.

A formation tester or formation testing tool may include an acoustic transmitter and an array of acoustic receivers distributed along a body of the tool. The transmitter may emit acoustic signals or waves, which then travel through the formation and may be received by the acoustic receivers. The times at which the acoustic receivers detect the emitted acoustic waves vary based on, among other things, the distances or spacing between the receivers and the slownesses of the materials through which the acoustic waves travel to reach the receivers. As a result, in general, an analysis of the manner in which acoustic signals are received by an acoustic receiver array on a downhole tool can yield information about the properties (e.g., slownesses) of formation(s) adjacent to a borehole.

However, processing the acoustic signal information or data generated as a result of the acoustic signals or waves received by the acoustic receivers can present certain difficulties. For example, because of the various paths via which acoustic waves may reach the receivers, waves traveling via different paths and/or through different materials may nevertheless overlap in time and/or frequency when detected by the receivers. As a result, analyzing a particular signal of interest and/or removing or extracting a signal of interest from the acoustic data may be very difficult.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 8 depicts an example method to obtain a coherence map and detect a frequency/time range of a wave component of interest according to one or more aspects of the present disclosure.

FIG. 9 depicts stacking of wavelet maps at a reference receiver according to one or more aspects of the present disclosure.

FIG. 10 depicts an example coherence map for a known casing slowness according to one or more aspects of the present disclosure.

FIG. 11 depicts an example detected time/frequency range of the wave component of interest according to one or more aspects of the present disclosure.

FIG. 14 depicts an example method to extract a casing component according to one or more aspects of the present disclosure.

FIGS. 15-17 depict the stacking of a subarray of wavelet maps from input raw waveforms containing only casing arrival according to one or more aspects of the present disclosure.

SUMMARY

Figure 1:
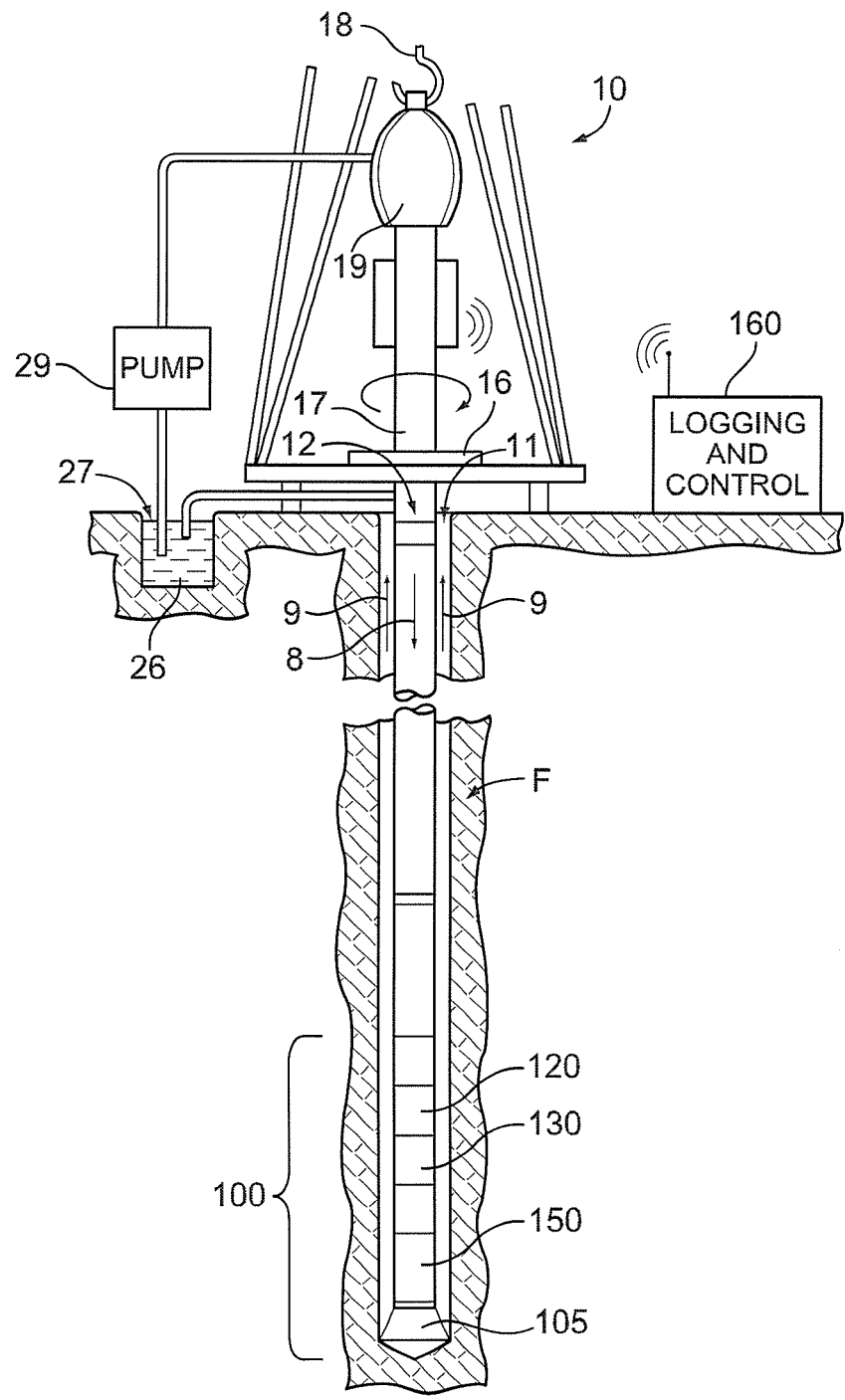
FIG. 1 is a wellsite system according to one or more aspects of the present disclosure.

According to one aspect of the present disclosure, an example method comprises: receiving acoustic waveform data representing acoustic signals traversing at least a portion of a borehole adjacent a subterranean formation; performing a direct transform operation on the acoustic waveform data to generate wavelet map data, the wavelet map data comprising a time-frequency representation of the acoustic waveform data; identifying a waveform of interest via the wavelet map data; extracting data associated with the waveform of interest from the wavelet map data; generating filtered wavelet map data based on the extracted data; and performing an inverse transform operation on the filtered wavelet map data to generate filtered acoustic waveform data.

In accordance with another aspect of the present disclosure, an example method, comprises: receiving acoustic data associated with a plurality of receivers coupled to a downhole tool; transforming at least some of the acoustic data to generate a respective time-frequency data set for each of the receivers; stacking the time-frequency data sets to form a coherence data set; identifying a portion of the coherence data set corresponding to arrival of a particular type of acoustic signal at the receivers; and filtering the received acoustic data using the identified portion of the coherence data set.

In accordance with another aspect of the present disclosure, an example method comprises performing a direct complex continuous wavelet transform on acoustic data associated with a plurality of receivers coupled to a downhole tool to form wavelet maps corresponding to each of the receivers; generating a coherence map based on the wavelet maps; identifying a casing arrival waveform via the coherence map; and removing the casing arrival waveform from the acoustic data to form filtered acoustic data.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features such that the first and second features may not be in direct contact.

One or more aspects of the present disclosure relate to filtering acoustic waveforms in downhole environments. More specifically, the methods and apparatus described herein may be used to extract and/or remove a wave component or signal of interest from an acoustic waveform such as waveforms received via an array of acoustic receivers coupled to a downhole tool. The wave component or signal of interest may, for example, be a casing arrival waveform, which may be extracted and/or removed (i.e., filtered) from the acoustic signals received by the array of receivers. Removing such waveforms (e.g., a casing arrival waveform) from the acoustic signals or waveforms received by an acoustic receiver array coupled to a downhole tool may enable improved analysis of formation slownesses and/or other parameters or characteristics of subterranean formations.

In the examples described herein, a wave component or signal of interest may be extracted in time, frequency and slowness domains on a frame-by-frame basis. Thus, the processing speed of the examples described herein enables substantially real-time processing of acoustic signals or waves received by acoustic receiver arrays in a downhole environment such as wireline logging and/or logging while drilling operations. Further, the examples described herein employ direct and inverse wavelet transforms that enable independent manipulation of signals generated by acoustic receiver arrays at different frequencies (e.g., at each frequency of interest). Thus, the examples described herein may be used to process dispersive and non-dispersive waves and may be applicable to any acoustic waveforms or signals for which slowness can vary with frequency.

The example methods and apparatus described herein may receive acoustic waveform data representing acoustic signals traversing at least a portion of a borehole adjacent a subterranean formation and then perform a direct transform operation on the acoustic waveform data to generate wavelet map data. The acoustic waveform data may be received via an array of acoustic receivers coupled to a downhole tool in the borehole adjacent to the subterranean formation, and the direct transform operation may be a complex continuous wavelet transform. Thus, the wavelet map data comprises a two-dimensional time-frequency representation or data set of the acoustic waveform data (e.g., for each of the receivers of a receiver array).

The examples described herein may then identify a signal or waveform of interest via the wavelet map data. The signal or waveform of interest may correspond to particular type of acoustic signal such as a signal moving along or through a casing of the borehole such as a casing arrival or, more generally, a shear wave or a compressional wave. To identify the signal or waveform of interest, the examples described herein may calculate coherence data or coherence data sets based on the wavelet map data and may use the coherence data or data sets to identify the waveform of interest. The coherence data may be calculated based on the wavelet map data by stacking wavelet map data or a data set for each of a plurality of the acoustic signals corresponding to respective acoustic receivers in the array of receivers to generate coherence map data or a coherence data set. To identify the waveform of interest a peak coherence in the coherence map data may be found or a pattern in the coherence map data may be recognized (e.g., via a person and/or machine).

Once the signal or waveform of interest has been identified, the example methods and apparatus may extract data associated with the waveform of interest from the wavelet map data. Such extraction may be performed by identifying a high coherence area in the coherence map data and identifying peak coherence values corresponding to a plurality of frequencies and slownesses to generate frequency-slowness data. The frequency-slowness data may then be used to extract the data associated with the waveform of interest by, for example, generating wavelet maps associated with the waveform of interest based on the frequency-slowness data.

The examples may then generate filtered wavelet maps or map data based on the extracted data. The filtered wavelet map data may be either the extracted signal itself or the original signal or acoustic waveform minus the extracted signal (i.e., the extracted signal may be removed or subtracted from the original acoustic waveform). In one example where the downhole tool is lowered into a cased borehole, the waveform or signal of interest may be an arrival at the acoustic array associate with the casing. In that example, the casing arrival wave or signal may be removed from the original acoustic waveforms or signals received by the acoustic array to generate filtered wavelet map data that better correspond to or represent a slowness of the subterranean formation.

The examples may then perform an inverse transform operation such as an inverse complex continuous wavelet transform on the filtered wavelet map data (e.g., stacked filtered wavelet maps) to generate filtered acoustic waveform data. Additionally, in accordance with the example described herein, semblance processing may be performed on the filtered acoustic waveform data and, as noted above, the operations associated with the examples described herein may be performed on a real-time basis during a logging operation in the borehole, for example.

In one example described herein, slowness information in a time-spacing plane at each frequency is used by processing array waveforms, for example, acquired at receivers attached or coupled to an acoustic measurement tool. This better enables or facilitates the separation of a wave component of interest from other wave components. The time shift property of the continuous wavelet transform allows time shifting of the transformed or two-dimensional signal and, as a result, coherent signals or coherences of the array waveforms in the time, frequency and slowness domains can be obtained using slowness and receiver spacing(s). In other words, to detect coherent signals of interest in time, frequency and space domains, an array of the converted two-dimensional complex signals can be stacked at a reference receiver position using time-shifting calculated from slowness and inter-receiver spacing. This stacking can be done using a full-array or a subarray (e.g., a subset) of the receivers. Furthermore, coherences may be calculated from the coherent signals, the number of receivers and total signal energy of every receiver used. The wave component of interest can be identified in the three-dimensional coherence data using peak finding, pattern recognition method and/or by human intervention.

The coherence data or value(s) may be used to identify a target wave in the three-dimensional domain and/or to extract/remove it from an array of two-dimensional signals. Due to the admissibility condition of the continuous wavelet transform, namely that energy of the time domain waveform is conserved in the two-dimensional signal (e.g., time-frequency domain), a reconstruction formula to reconstruct a temporal signal from its wavelet transform representation exists as set forth in more detail below.

Generally, because the coherent signal may be averaged by the number of receivers used for the stacking, the target wave or waveform of interest in the detected area may remain a dominant component, thereby enabling extraction of substantially only the coherent signal and/or enabling removal of the signal from an array of original two-dimensional signals using time shifting calculated from the frequency-slowness relationships of the target wave and inter-receiver spacing. Finally, the extracted or filtered array waveforms may be reconstructed by inverse complex continuous wavelet transform. Additionally, to obtain formation slowness in cased borehole, zoning of the casing arrival time and application of the existing band-pass filter techniques may be used to facilitate the examples described herein.

FIG. 1 depicts a wellsite system including downhole tool(s) according to one or more aspects of the present disclosure. The wellsite drilling system of FIG. 1 can be employed onshore and/or offshore. In the example wellsite system of FIG. 1, a borehole 11 is formed in one or more subsurface formations by rotary and/or directional drilling.

As illustrated in FIG. 1, a drill string 12 is suspended in the borehole 11 and includes a bottom hole assembly (BHA) 100 having a drill bit 105 at its lower end. The BHA 100 may incorporate a formation tester or sampling tool embodying aspects of the example acoustic filtering apparatus and methods described herein. A surface system includes a platform and derrick assembly 10 positioned over the borehole 11. The derrick assembly 10 includes a rotary table 16, a kelly 17, a hook 18 and a rotary swivel 19. The drill string 12 is rotated by the rotary table 16, energized by means not shown, which engages the kelly 17 at an upper end of the drill string 12. The example drill string 12 is suspended from the hook 18, which is attached to a traveling block (not shown), and through the kelly 17 and the rotary swivel 19, which permits rotation of the drill string 12 relative to the hook 18. A top drive system may also be used.

In the example depicted in FIG. 1, the surface system further includes drilling fluid 26, which is commonly referred to in the industry as mud, and which is stored in a pit 27 formed at the well site. A pump 29 delivers the drilling fluid 26 to the interior of the drill string 12 via a port in the rotary swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9. The drilling fluid 26 lubricates the drill bit 105, carries formation cuttings up to the surface as it is returned to the pit 27 for recirculation, and creates a mudcake layer (not shown) on the walls of the borehole 11.

The example bottom hole assembly 100 of FIG. 1 includes, among other things, any number and/or type(s) of logging-while-drilling (LWD) modules or tools (one of which is designated by reference numeral 120) and/or measuring-while-drilling (MWD) modules (one of which is designated by reference numeral 130), a rotary-steerable system or mud motor 150 and the example drill bit 105. The MWD module 130 measures the azimuth and inclination of the BHA 100 to enable monitoring of the borehole trajectory.

The example LWD tool 120 and/or the example MWD module 130 of FIG. 1 may be housed in a special type of drill collar, as it is known in the art, and contains any number of logging tools and/or fluid sampling devices. The example LWD tool 120 includes capabilities for measuring, processing and/or storing information, as well as for communicating with the MWD module 130 and/or directly with the surface equipment, such as, for example, a logging and control computer 160.

The logging and control computer 160 may include a user interface that enables parameters to be input and or outputs to be displayed that may be associated with the drilling operation and/or a formation F traversed by the borehole 11. While the logging and control computer 160 is depicted uphole and adjacent the wellsite system, a portion or all of the logging and control computer 160 may be positioned in the bottom hole assembly 100 and/or in a remote location.

Figure 2:
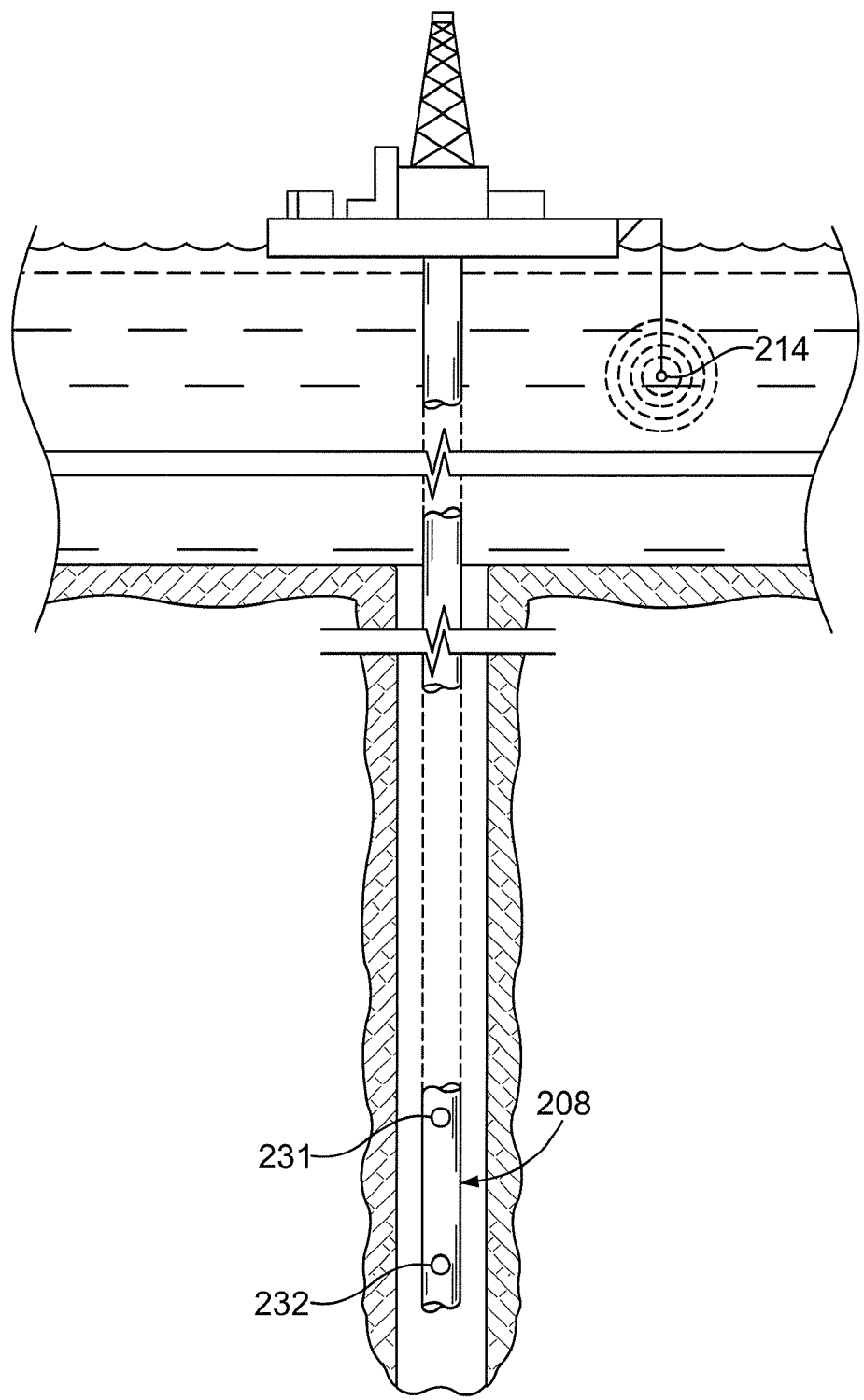
FIG. 2 is a logging-while-drilling system according to one or more aspects of the present disclosure.

FIG. 2 illustrates a sonic logging-while-drilling tool 208 that can be the LWD tool 120, or can be a part of an LWD tool suite 120A of the type described in U.S. Pat. No. 6,308,137, incorporated herein by reference. Any suitable type of uphole or downhole source or transmitter can be provided. An uphole processor controls the firing of a transmitter 214. The uphole equipment can also include acoustic receivers and a recorder for capturing reference signals near the source. The uphole equipment further includes telemetry equipment for receiving MWD signals from the downhole equipment. The telemetry equipment and the recorder are typically coupled to a processor so that recordings may be synchronized using uphole and downhole clocks. The downhole LWD module 208 includes at least acoustic receivers 231 and 232, which are coupled to a signal processor so that recordings may be made of signals detected by the receivers in synchronization with the firing of the signal source.

One or more modules or tools of the example drill string 12 shown in FIG. 1 and/or the example tool 208 of FIG. 2 may employ the example apparatus described herein. While the example apparatus described herein are described in the context of drill strings and/or wireline tools, they are also applicable to any number and/or type(s) of additional and/or alternative downhole tools such as coiled tubing deployed tools.

A more detailed description of the use of a complex continuous wavelet transform (CWT) and reproducing kernel are now described. The wavelet filtering method used in conjunction with the examples described herein may be divided into two parts, which are a wavelet transform computation or operation and a waveform reconstruction operation. The wavelet transform operation transforms a time domain waveform into a two-dimensional time-frequency map or wavelet map. More specifically, as shown in Equations 1 and 2 below, the wavelet transform S of a signal s (t) at a point (b, a) is the scalar product of the signal by the dilated and translated wavelet family g (t).

$$S(b, a) = \;<T^b D^a[g(t)], s(t)> = \frac{1}{\sqrt{a}} \int s(t) g^*\left(\frac{t-b}{a}\right) dt. \quad (1)$$

$$g(b, a)(t) = T^b D^a[g(t)] = \frac{1}{\sqrt{a}} g\left(\frac{t-b}{a}\right). \quad (2)$$

In Equations 1 and 2, b corresponds to the temporal localization parameter, 1/a corresponds to the frequency with a being the scale parameter, which is strictly positive, and g* is the conjugate of g dilated in time of a (a>0) and translated in time of b. The choice of the mother wavelet is free provided it respects the admissibility condition set forth in Equation 3 below.

$$\int_0^\infty \frac{|\hat{g}(\omega)|^2}{\omega} d\omega < \infty \quad (3)$$

In Equation 3, $\hat{g}$ is the Fourier transform of g and ω is the dual variable of the time t. The square of the modulus of the wavelet transform can be seen as an energy density concentrated in the time-frequency plane as set forth in Equations 4 and 5 below.

$$|s(t)|^2 dt = C_g^{-1} \int\int |S(b, a)|^2 \frac{da\,db}{a^2}, \quad (4)$$

$$C_g = 2\pi \int \frac{|\hat{g}(\omega)|^2}{|\omega|} d\omega. \quad (5)$$

In addition, due to the admissibility condition, a reconstruction formula enables the reconstruction of a time domain or temporal signal from its wavelet transform representation (Saracco, G., 1989, Acoustic propagation in harmonic and transient regime through an inhomogeneous medium: Asymptotic methods and Wavelet transforms, PhD thesis: Acoustics & Dynamic of vibrations, CNRS-UPR 7051-LMA & UER II, Campus de Luminy, Marseille, France), the entirety of which is incorporate by reference herein. Equation 6 below demonstrates such a reconstruction.

$$s(t) = \Re\left[C_g^{-1} \int\int S(b, a) a^{1/2} g\left(\frac{t-b}{a}\right) \frac{da\,db}{a^2}\right]. \quad (6)$$

The CWT is non-orthogonal, <g (b, a), g (b', a')>≠0. As a result, there exists a reproducing kernel $N_g$ defined from Equations (1) and (5) as defined in Equation 7 below.

$$N_g(b,a,v,u) = C_g^{-1} <g(b,a), g(v,u)>. \quad (7)$$

In addition, all wavelet coefficients verify the reproducing equation as depicted in Equation 8 below.

$$S(v, u) = \int S(b, a) N_g(v, u, b, a) \frac{db\,da}{a^2}. \quad (8)$$

Wavelet filtering involves extracting from the time-scale half-plane, a signal component fi(t) from a signal s(t) composed by the sum of m waves fi (i=1, . . . , m) by using the reproducing equation (Equation 8) and the properties of the reproducing kernel and the CWT. A mask Mfi (b, a) enables definition of a polygon function h associated with each wave in the half-plane (b, a) as depicted in Equation 9 below.

$$M_{f_i}(b,a)=0, E_{S_{f_i}}(b,a)<\chi.$$

$$M_{f_i}(b,a)=1, E_{S_{f_i}}(b,a)\geq\chi. \quad (9)$$

In Equation 9, $S_{f_i}$ is the wavelet coefficient of the signal component fi (t) and χ is the energy threshold. Let Dh be the domain defined by the polygon function h, and then the energy pattern E related to a component fi (t) can be expressed as shown in Equations 10 and 11 below.

$$E_{S_{f_i}} = M_{f_i}(b, a) E_{S_s}|_{D_h}. \quad (10)$$

$$= \int\int |S_{f_i}(b, a)|^2 \frac{da\,db}{a^2} \leq C_g^{-1} \int\int_{D_h} |S_S(b, a)|^2 \frac{da\,db}{a^2}. \quad (11)$$

In Equation 11, $S_S$ is the total wavelet coefficient. $E_S f_i$ is therefore a function of finite energy. $S_S$ (b, a) and $S_{f_i}$ (b, a) verify the reproducing Equation (8). The result is Equation 12 below.

$$\int\int_{D_h} S_S(v, u)(v, u; b, a) \frac{du\,dv}{u^2} = \int\int S_{f_i}(v, u) N(v, u; b, a) \frac{du\,dv}{u^2} \quad (12)$$
$$= S_{f_i}(b, a).$$

The foregoing equations demonstrate that the inverse continuous transform can be used as set forth more generally above. The use of a progressive and modulated Gaussian function as analyzing wavelet (progressive Morlet type wavelet) enables development of an explicit formula of the reproducing kernel (Grossmann, A., Kronland-Martinet, R., Morlet, J., 1989, Reading and understanding continuous wavelet transform, Wavelet, Time-frequency Methods and Phase Space, Ed. J M Combes, A. Grossmann, P. Tchamitchian, Springer-verlag, Berlin), the entirety of which is incorporated by reference herein. This analyzing wavelet is a function well localized in the time-frequency domain. As a result, the associated kernel is well localized in the plane of the transform. Thus, in first approximation, the reproducing kernel N (bo, ao; b, a) can be considered as a delta function for the couples {ao, bo}.

This result demonstrates that by using a Morlet's wavelet, the form of the mask is not critical but, rather, it mainly facilitates considering all the energy patterns of the signal to be filtered. If the mask includes some information far from the energy pattern of the signal, the contribution coming from this far information will not affect the results of the filtering. Therefore it is possible to filter the component i of the signal s (t) using the inverse continuous wavelet transform based on the reconstruction formula set forth as Equation 13 below.

$$f_i(t) = \Re\left[C_g^{-1} \int\int S_{f_i}(b, a) a^{1/2} g\left(\frac{t-b}{a}\right) \frac{da\,db}{a^2}\right]. \quad (13)$$

The examples described herein may be applied to filter casing arrival due to the properties of the CWT and its reconstruction formula or any other signal of interest for any time of time series (seismic, borehole seismic, etc.). This processing enables filtering of signals that are close in time and frequency such as compressional and casing arrival signals in a fast formation.

Figure 4:
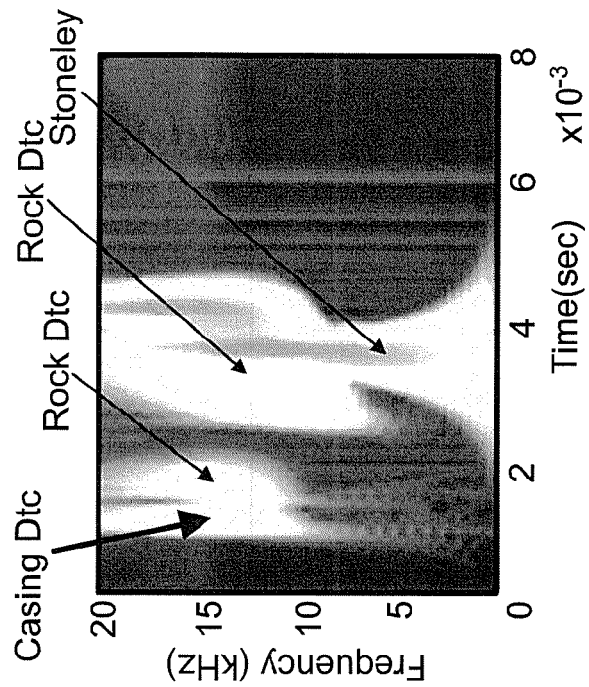
FIG. 4 depicts an example of wavelet transform applied to a monopole waveform recorded in a cased borehole.
Figure 5:
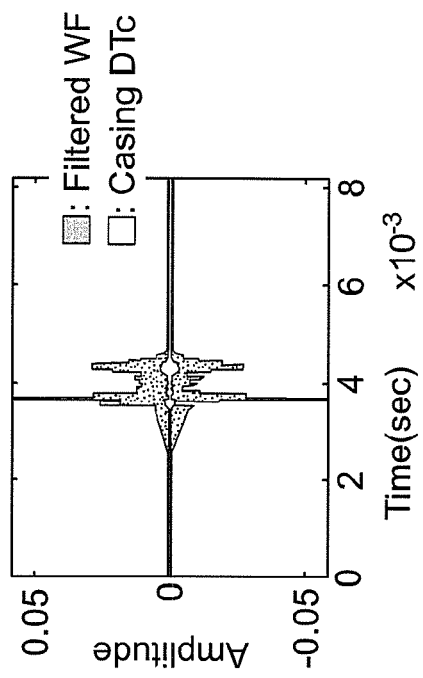
FIG. 5 depicts an example of casing filtering according to one or more aspects of the present disclosure.
Figure 3:
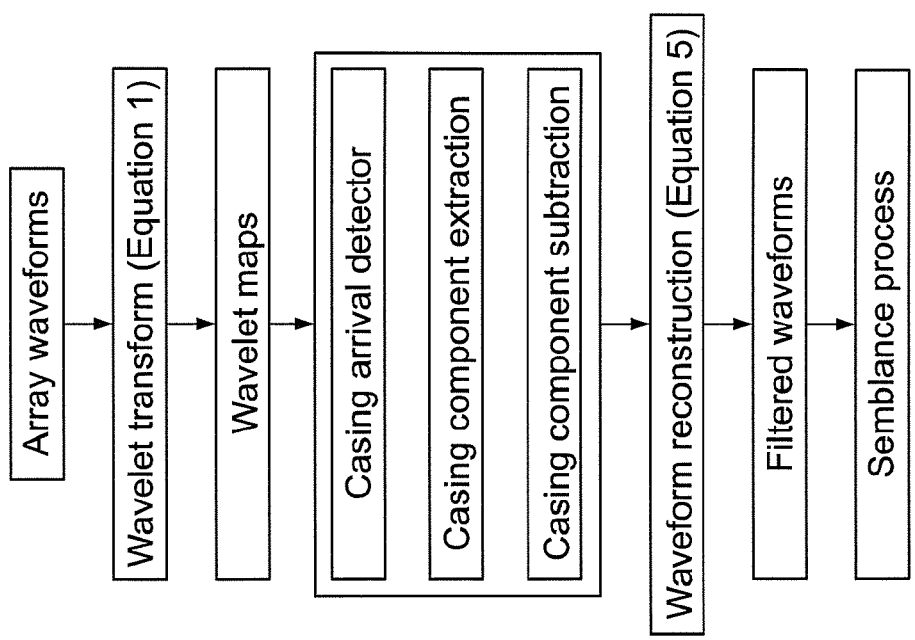
FIG. 3 depicts an example wavelet casing arrival filter process according to one or more aspects of the present disclosure.

Now turning in detail to FIGS. 3-5, the casing filtering example described herein may be composed of three main parts. First, the array waveforms are transformed into time-frequency domain. In practice it means that each waveform of the array is to be mapped into the time-frequency domain. Second, the casing arrival is identified in the maps and then removed from the time frequency map. Third, the reconstruction formula is applied to wavelet maps to reconstruct time signals prior applying semblance processing to these filtered waveforms where the casing arrival has been removed. FIG. 3 shows the processing flow of the wavelet casing arrival filter. However, this workflow can be applied to remove other arrivals of interest such as compressional and shear waves. FIG. 4 shows how the different arrivals may overlap in time and frequency in the waveform, and FIG. 5 shows the filtered waveform superimposed on the extracted casing arrival waveform.

Figure 6:
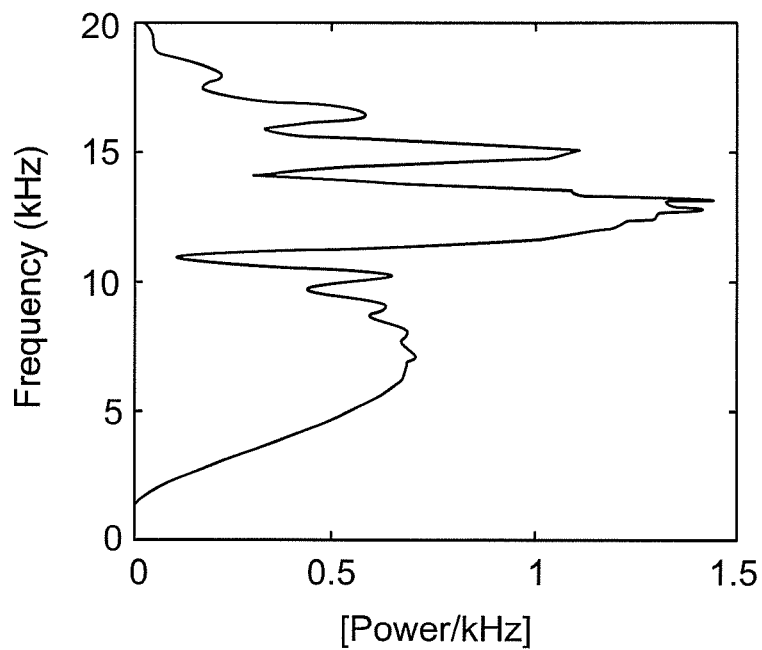
FIG. 6 depicts a Fast Fourier Transform of an acoustic signal.
Figure 7:
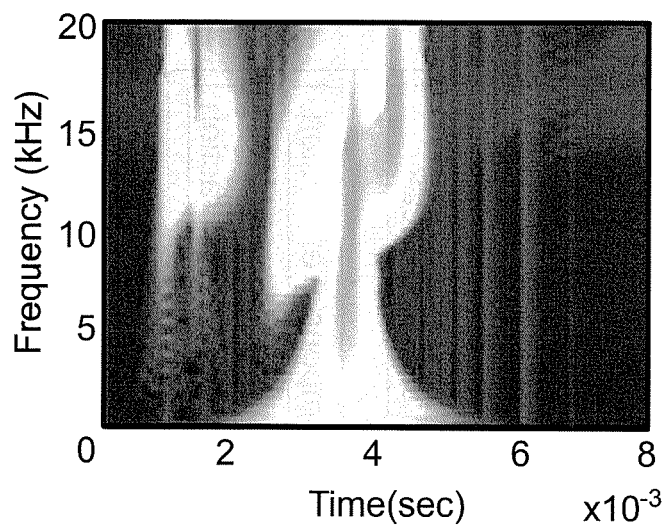
FIG. 7 depicts a wavelet transform or map of the acoustic signal of FIG. 6 according to one or more aspects of the present disclosure.
Figure 12:
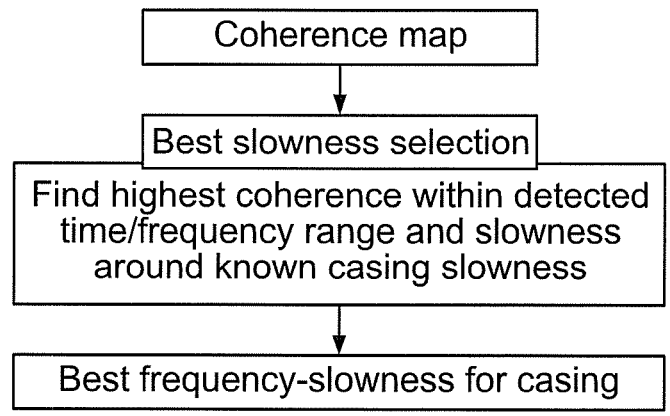
FIG. 12 depicts an example method to find best frequency-slowness relationships for a casing according to one or more aspects of the present disclosure.

FIGS. 6 and 7 provide a comparison between an acoustic waveform that has undergone a Fast Fourier Transform (FIG. 6) and that same waveform having instead undergone a wavelet transform (e.g., transformed into a wavelet map or maps) (FIG. 7) as described herein. As can be seen in FIG. 7, the wavelet map enables the separation of components overlapping in frequency domain.

FIGS. 8-17 depict operations that may be performed in accordance with the examples described herein. In particular, FIGS. 8-11 show an example of casing arrival detection in which an estimate of casing slowness is known. For the casing arrival detection, as set forth in Equation 14 below, coherence ρ can be computed to find the position of the casing in time, frequency and slowness plane due to the time shift property of the CWT.

$$\rho_a(t, s) = \frac{\int_t^{t+T_W} \left| \sum_{i=1}^{M} S_i(a, t + s(i - j)\delta) \right|^2 dt}{M \int_t^{t+T_W} \sum_{i=1}^{M} |S_i(a, t + s(i - j)\delta)|^2 dt}. \tag{14}$$

Where $S_i$ is wavelet transformed waveform at i-th receiver, a corresponds to the frequency, t is the time, s is the slowness, δ and j are respectively the receiver spacing and reference receiver number. M is the number of receivers and Tw at scale a is the time width used to compute the coherence. A high coherence area corresponds to a signal propagating with a slowness s across the array waveforms. The time range of casing can also be estimated by zoning the casing arrival time using the method described in U.S. Pat. No. 6,868,341, the entirety of which is incorporated by reference herein.

Figure 13:
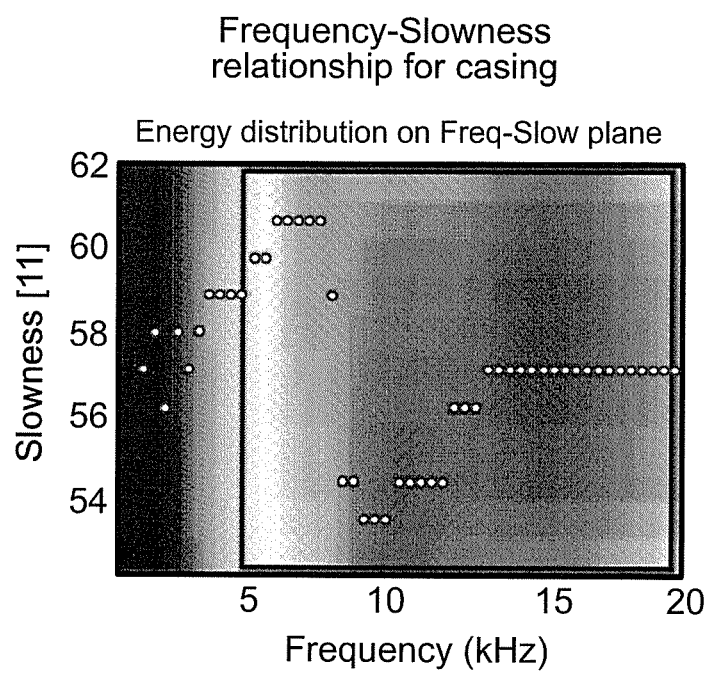
FIG. 13 depicts an example of frequency-slowness plane according to one or more aspects of the present disclosure.

In real data, casing slowness may not be constant and may vary slightly with frequency. To find the best frequency-slowness relationship for the casing signal, the highest coherences are searched in the coherence map within detected time/frequency and slowness range around known casing slowness. FIG. 13 shows an example of the frequency-slowness plane.

FIGS. 14-17 show example operations to extract the casing component from input array waveforms. Subarrays for each receiver may be prepared to compensate amplitude variations along the array. All subarrays are selected from one full-array of receivers. Then, wavelet maps of each subarray are stacked at center receiver position of each subarray using time shifting calculated from the best frequency-slowness and receiver spacing. Finally, stacked map at each receiver position is averaged by the number of receivers in the subarray to obtain coherent signal of a casing component. In performing casing component subtraction, wavelet maps containing only casing arrival are subtracted from array of wavelet maps of raw waveforms. As a result, wavelet maps keeping residual components other than casing component are obtained. The filtered waveforms may then be reconstructed from these maps using the reconstruction formula based on the inverse wavelet transform.

Figure 18:
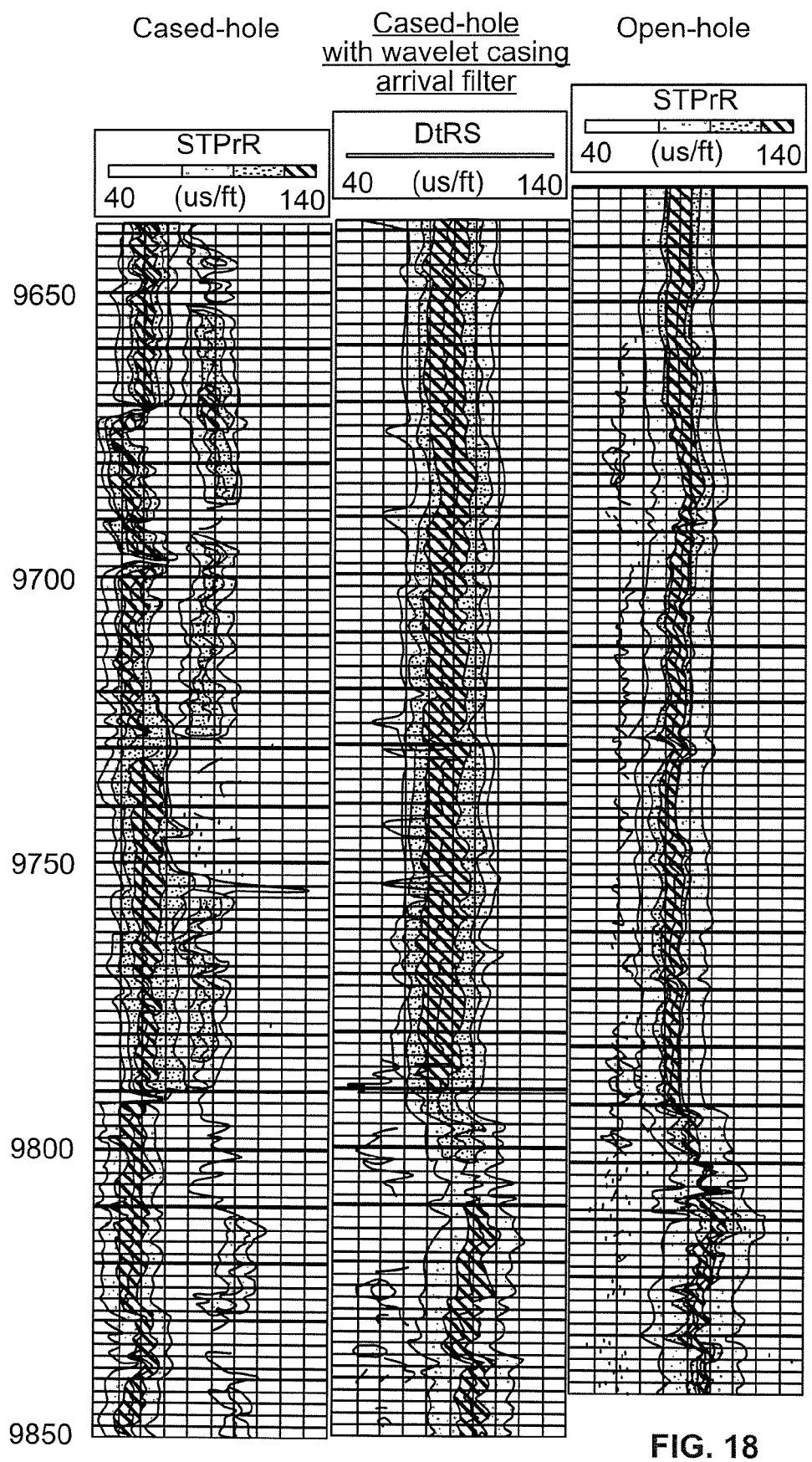
FIG. 18 depicts a comparison of slowness-time projections and slowness logs of cased-hole and open-hole data according to one or more aspects of the present disclosure.

FIG. 18 shows an example of semblance processing applied to cased-hole and open-hole data recorded in the same section. The leftmost track presents the processing results obtained on cased hole data while middle track shows the semblance processing result applied on cased hole data after filtering of casing signal using the examples described herein. The rightmost track presents the processing results of the data recorded in the openhole section prior the casing was set. As can be seen in FIG. 18, the open hole processing results are substantially similar to the results obtained after performing the filtering operation as set forth herein.

Figure 19:
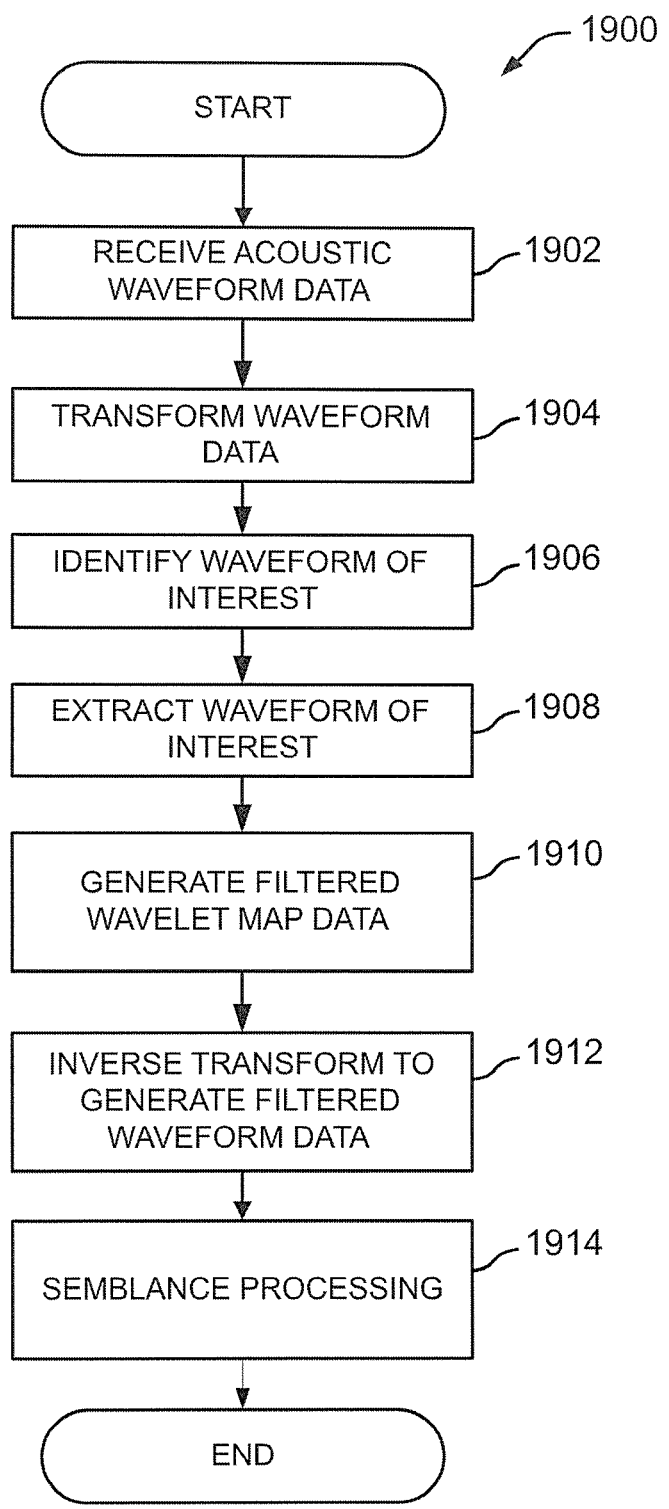
FIG. 19 is a flow diagram of an example method according to one or more aspects of the present disclosure.

FIG. 19 depicts an example process or method 1900 that may be used to implement the teachings of this disclosure. Initially, the example method 1900 receives acoustic waveform data representing acoustic signals traversing at least a portion of a borehole adjacent a subterranean formation (block 1902). A direct transform operation (e.g., a complex continuous wavelet transform) is then performed on the acoustic waveform data to generate wavelet map data (block 1904). The examples described herein may then identify a signal or waveform of interest via the wavelet map data (block 1906). The signal or waveform of interest may correspond to particular type of acoustic signal such as a signal moving along or through a casing of the borehole such as a casing arrival or, more generally, a shear wave or a compressional wave. To identify the signal or waveform of interest, the examples described herein may calculate coherence data or coherence data sets based on the wavelet map data and may use the coherence data or data sets to identify the waveform of interest. The coherence data may be calculated based on the wavelet map data by stacking wavelet map data or a data set for each of a plurality of the acoustic signals corresponding to respective acoustic receivers in the array of receivers to generate coherence map data or a coherence data set. To identify the waveform of interest a peak coherence in the coherence map data may be found or a pattern in the coherence map data may be recognized (e.g., via a person and/or machine).

The example method 1900 may then extract data associated with the waveform of interest from the wavelet map data (block 1908). Such extraction may be performed by identifying a high coherence area in the coherence map data and identifying peak coherence values corresponding to a plurality of frequencies and slownesses to generate frequency-slowness data. The frequency-slowness data may then be used to extract the data associated with the waveform of interest by, for example, generating wavelet maps associated with the waveform of interest based on the frequency-slowness data.

The example method 1900 may then generate filtered wavelet map or map data based on the extracted data (block 1910). The filtered wavelet map data may be either the extracted signal itself or the original signal or acoustic waveform minus the extracted signal (i.e., the extracted signal may be removed or subtracted from the original acoustic waveform. In one example where the downhole tool is lowered into a cased borehole, the waveform or signal of interest may be an arrival at the acoustic array associated with the casing. In that example, the casing arrival wave or signal may be removed from the original acoustic waveforms or signals received by the acoustic array to generate filtered wavelet map data that better correspond to or represent a slowness of the subterranean formation.

The example method 1900 may then perform an inverse transform operation such as an inverse complex continuous wavelet transform on the filtered wavelet map data (e.g., stacked filtered wavelet maps) to generate filtered acoustic waveform data (block 1912). Additionally, semblance processing may be performed on the filtered acoustic waveform data (block 1914) and, as noted above, the operations associated with the examples described herein may be performed on a real-time basis during a logging operation in the borehole, for example.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only as structural equivalents, but also equivalent structures. Thus, although a nail and a screw may be not structural equivalents in that a nail employs a cylindrical surface to secured wooden parts together, whereas a screw employs a helical surface, in the environment of fastening wooden parts, a nail and a screw may be equivalent structures. It is the express intent of the applicant not to invoke 35 U.S.C. §112, paragraph 6 for any limitations of any of the claims herein, except for those in which the claim expressly uses the words "means for" together with an associated function.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method, comprising:
   receiving acoustic waveform data representing acoustic signals traversing at least a portion of a borehole adjacent a subterranean formation;
   performing a direct wavelet transform operation on the acoustic waveform data to generate first transformed data, the first transformed data comprising a time-frequency-domain representation of the acoustic waveform data;
   stacking the first transformed data to form a coherence data set;
   identifying a first wave component of interest via the coherence dataset, wherein the first wave component of interest is a casing arrival waveform;
   extracting second transformed data in the time-frequency domain associated with the first wave component;
   generating third transformed data in the time-frequency domain by removing the second transformed data from the first transformed data; and
   performing an inverse wavelet transform operation on the third transformed data in the time-frequency domain to generate filtered acoustic waveform data in time domain.

2. The method of claim 1, wherein using the coherence data to identify the first wave component of interest comprises identifying a peak coherence in the coherence map data or recognizing a pattern in the coherence map data.

3. The method of claim 1, wherein using tile coherence data to identify the first wave component of interest comprises identifying a high coherence area in the coherence map data and identifying peak coherence values corresponding to a plurality of frequencies and slownesses to generate frequency-slowness data.

4. The method of claim 3, wherein extracting second transformed data in the time-frequency domain associated with the first wave component comprises using the frequency-slowness data to extract second transformed data in the time-frequency domain associated with the first wave component of interest.

5. The method of claim 4, wherein using the frequency-slowness data to extract second transformed data in the time-frequency domain associated with the first wave component of interest comprises generating wavelet maps associated with the first wave component of interest based on the frequency-slowness data.

6. The method of claim 1, wherein the direct wavelet transform operation is a continuous wavelet transform and the inverse wavelet transform operation is an inverse continuous wavelet transform.

7. The method of claim 1, wherein the acoustic waveform data is received via an array of acoustic receivers coupled to a downhole tool in the borehole adjacent to the subterranean formation.

8. The method of claim 1 further comprising performing semblance processing on the filtered acoustic waveform data.

9. The method of claim 1, wherein the first wave component of interest corresponds to an acoustic signal associated with a shear wave or a compressional wave.

10. The method of claim 1, wherein the filtered acoustic waveform data corresponds to a slowness of the subterranean formation.

11. The method of claim 1, wherein performing the inverse wavelet transform operation comprises performing the inverse wavelet transform operation on a real-time basis during a logging operation in the borehole.

12. A method, comprising:
   receiving acoustic data associated with a plurality of receivers coupled to a downhole tool;
   transforming at least some of the acoustic data using wavelet transformation to generate a respective time-frequency data set in the time-frequency domain for each of the receivers;
   stacking the time-frequency data sets to form a coherence data set;
   identifying a portion of the coherence data set corresponding to arrival of a particular type of acoustic signal that is a casing arrival waveform at the receivers; and
   filtering the received acoustic data using the identified portion of the coherence data set in the time-frequency domain.

13. The method of claim 12, wherein identifying the portion of the coherence data set corresponding to the arrival of the particular type of acoustic signal comprises finding a peak coherence value or a pattern of data.

14. The method of claim 12, wherein filtering the, received acoustic data using the identified portion of the coherence data set comprises performing an inverse wavelet transform.

* * * * *